3,020,304
CHLOROMETHYLATED O,O-DIALKYL-THIO-
PHOSPHORIC ACID ESTERS
Otto Scherer, Helmut Hahn, and Gerhard Stähler, Frankfurt am Main, Germany, assignors to Farbwerke Hoechst Aktiengesellschaft vormals Meister Lucius & Brüning, Frankfurt am Main, Germany, a corporation of Germany
No Drawing. Filed Sept. 17, 1957, Ser. No. 684,403
4 Claims. (Cl. 260—461)

Because of their sensitiveness to acids it is not possible to chloromethylate O,O-dialkylthiono- and thionothiolphosphoric acids according to the usual processes. Therefore, corresponding chloromethyl compounds have hitherto not become known.

Now, we have found that chloromethyl compounds of O,O-dialkyl-thiophosphoric acids can easily be obtained by reacting their salts with chloro-bromomethane. As salts there are preferably taken into consideration alkali metal salts and ammonium salts. The corresponding compounds are of the general formula

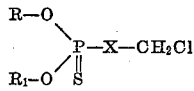

in which R and $R_1$ stands for $CH_3$ or $C_2H_5$ and X stands for oxygen or sulfur.

The reaction is suitably carried out with an excess of chlorobromo-methane. It is also possible to operate in the presence of an inert solvent, for example methanol, ethanol, acetone, tetrahydrofurane. The reaction is carried out at a moderately elevated temperature, generally below 100° C. It is most favorably performed at 50–70° C.

The reaction takes for instance the following course

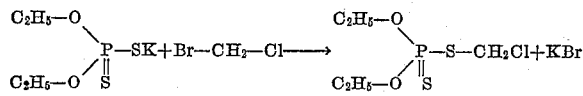

In order to increase the yield of the chloromethyl compound it is of advantage to add a small amount of alkali metal iodide which may amount to several percents of the thiophosphoric acid ester. After the reaction, the chlorobromo-methane used in excess can be recovered and used again for further batches after elimination by filtration of the bromide formed and after distillation of the chloromethyl compound.

The new compounds are water-clear oils which can be distilled in the vacuum under a gauge pressure of 5 mm. Hg. They possess a good efficiency as insecticides and form valuable intermediate products for the production of other insecticides.

The following examples serve to illustrate the invention but are not intended to limit it thereto:

*Example 1*

336 grams of potassium O,O-diethyl-thionothiol phosphate with 1000 grams of chlorobromo-methane are heated, while being stirred, for about 24 hours at 60° C. Potassium bromide is then filtered off and chlorobromomethane is distilled off (recovered 750 grams). 210 grams of crude chloromethyl ester are obtained. The pure O,O-diethyl-thionothiol-phosphoric acid-S-chloromethyl ester boils at 93–95° C. under a gauge pressure of 1 mm. Hg.

*Example 2*

672 grams of potassium O,O-diethyl-thionothiol phosphate are dissolved in 1.5 liters of methanol and heated with 1500 grams of chlorobromo-methane and about 5 grams of sodium iodide for 24 hours at 58° C. The solution is then shaken with ice water, the heavy layer is separated, dried over sodium sulfate and the excess chlorobromo-methane is almost completely recovered. From the crude chloromethyl ester (640 grams) 500 grams of pure O,O-diethyl-thionothiol-phosphoric acid-S-chloromethyl ester boiling at 93–95° C. under a gauge pressure of 1 mm. Hg are obtained. The residue which cannot be distilled consists of bis-(O,O-diethyl-thionothiolphosphoryl)-formal.

*Example 3*

When operating according to Example 1 or 2, O,O-dimethyl-thionothiol-phosphoric acid-S-chloromethyl-ester boiling at 100° C. under a gauge pressure of 10 mm. is obtained when starting from potassium O,O-dimethyl-thionothiol phosphate.

*Example 4*

110 grams of ammonium-O,O-diethyl-thiono-phosphate are dissolved in 500 cc. of methanol and heated with 600 grams of chlorobromomethane for 24 hours at about 60° C. The separated ammonium chloride is filtered off with suction, the solution is shaken with water. From the separated oil the excess chlorobromo-methane is distilled off. The residue (95 grams) is distilled in the vacuum. 77 grams of O,O-diethyl-thiono-phosphoric acid-O-chloromethyl-ester are obtained boiling at 118–122° C. under a gauge pressure of 1.5 mm. Hg.

We claim:
1. Compounds of the general formula

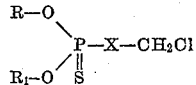

in which R and $R_1$ are members selected from the group consisting of $CH_3$ and $C_2H_5$, and X is a member selected from the group consisting of oxygen and sulfur.

2. O,O-diethyl-thionothiol-phosphoric acid-S-chloromethyl-ester boiling at 93–95° C. under a gauge pressure of 1 mm. Hg.

3. O,O-dimethyl-thionothiol-phosphoric acid-S-chloromethyl-ester boiling at 100° C. under a gauge pressure of 10 mm. Hg.

4. O,O-diethyl-thiono-phosphoric acid-O-chloromethyl-ester boiling at 118–122° C. under a gauge pressure of 1.5 mm. Hg.

References Cited in the file of this patent

UNITED STATES PATENTS

| | | |
|---|---|---|
| 2,266,514 | Romieux | Dec. 16, 1941 |
| 2,494,126 | Hoegberg | Jan. 10, 1950 |
| 2,494,283 | Cassaday et al. | Jan. 10, 1950 |
| 2,494,284 | Cassaday et al. | Jan. 10, 1950 |
| 2,611,728 | Bartlett et al. | Sept. 23, 1952 |
| 2,689,201 | Hansen | Sept. 14, 1954 |
| 2,852,549 | Coover et al. | Sept. 16, 1958 |
| 2,875,229 | Coover et al. | Feb. 24, 1959 |

FOREIGN PATENTS

| | | |
|---|---|---|
| 1,069,431 | France | July 7, 1954 |